July 3, 1928.
P. DETLEFSEN
1,675,535
TRIMMING TOOL
Filed July 22, 1927
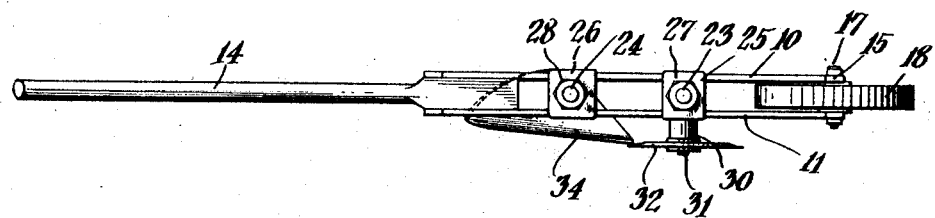
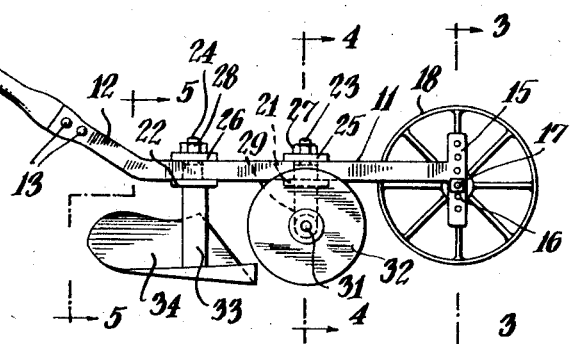
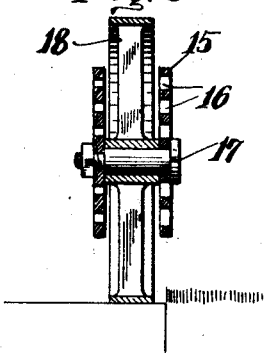
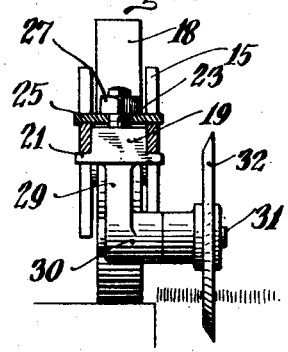
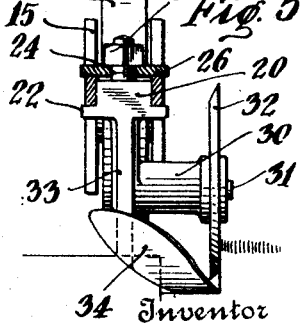
Inventor
Peter Detlefsen
By his Attorney Patented July 3, 1928.

1,675,535

UNITED STATES PATENT OFFICE.

PETER DETLEFSEN, OF NORTH BEND, NEBRASKA.

TRIMMING TOOL.

Application filed July 22, 1927. Serial No. 207,648.

This invention relates to trimming or cutting devices and more particularly to such as are used for evening the outside edges of a lawn covered with grass.

Heretofore, if it was desired to trim such a plot of ground, it was necessary to do so by hand, particularly if the adjacent ground was slightly elevated above the lawn. This obviously is a long and tedious method, resulting in discomfiture and the like.

It is therefore the main object of this invention to provide a cutting device having means whereby the device may be rolled along the higher elevation, while its cutting edge passes along the outskirts of the field to be trimmed.

A further object is in the provision of means to throw the cut grass aside, so as not to interfere with further trimming.

A still further aim is to provide a device of the class described, in which all the parts are manually adjustable to suit varied conditions, as will become obvious in a later paragraph.

These several objects, together with others, which will become apparent as the description progresses, are accomplished by the novel construction, combination and arrangement of few and simple elements, hereinafter delineated and depicted in the accompanying illustration, forming a material component of this disclosure, and in which:—

Figure 1 is a top plan view of the preferred form of this invention.

Figure 2 is a side elevational view of the same.

Figure 3 is a transverse sectional view taken on line 3—3 of Figure 2.

Figure 4 is a similar view taken on line 4—4 of Figure 2.

Figure 5 is a partial transverse sectional, partial rear elevational view taken on line 5—5 of Figure 2.

In the drawing, the numerals 10 and 11 generally designate a pair of spaced, parallel, metal side-frame members, the rear portions 12 of which are disposed at an angle, as shown in Figure 2, and to which is secured by bolts 13, an elongated handle 14.

The opposite ends of the members 10 and 11 are provided with vertical cross-pieces 15 having a plurality of openings 16 therein, in which is selectively engageable, an axle 17, on which is rotatably mounted a flat faced roller wheel 18 disposed intermediate the frame members.

Slidable intermediate the members 10 and 11 are a pair of blocks 19 and 20 having flanges 21 and 22 engaging the under edges of the members 10 and 11, the blocks being further provided with bolts 23 and 24, on which are disposed plates 25 and 26, held in engagement with the upper edges of the frame members by nuts 27 and 28.

Depending downwardly from the block 19 is a support 29, having at its lower end a bearing 30, in which is journalled a shaft 31 carrying a cutting disc 32.

Depending downwardly from the block 20 is a support 33, to which is fixed, at the lower end thereof, so as to follow the cutting disc 32, a plow-like fender 34.

Thus, if it is desired to trim the edge of a lawn adjacent which is bare elevated ground, the wheel 18 is rolled over the bare ground, as a walk, and the cutting disc 32 trims the grass as shown in Figure 5, by frictional engagement therewith, while the fender 34 throws the cut grass to one side so as not to interfere with either the operator or with continued trimming.

It will be noted that the height of the frame from the ground may be adjusted by engaging the axle 17 in any one of the openings 16 in the cross-piece 15.

It will further be noted that the fender 34 and the cutting disc 32 may be longitudinally adjusted by loosening the nuts 28 or 27 to slide the blocks 20 or 19 along the frame members 10 and 11.

While the foregoing is descriptive of the preferred form of my invention, it is to be understood that changes in size, proportion, adjustability, etc., may be made without departing from the spirit and scope of the appended claims.

Having thus described my invention, what I claim as new and desire to secure by Letters Patent, is:—

1. A trimming device comprising a pair of side frame members, a handle fixed to one end of said members, a guide wheel rotatably mounted in the other end of said members, means adjustable along said frame members to cut the grass, and means similarly adjustable along the frame members to throw the cut grass to one side.

2. A trimming device comprising a frame a handle fixed to one end of said frame, a cross-piece at the other end of said frame, said cross-piece being provided with a plurality of openings, a guide wheel selectively engageable in the openings, a pair of blocks slidable adjustably in said frame, a cutting disc rotatably mounted on one of said blocks, a plow-like fender fixed to the other of said blocks adapted to clear away the grass cut by said disc, and means for adjusting the distances of said disc and fender relative to said frame.

In witness whereof I have affixed my signature.

PETER DETLEFSEN.